United States Patent [19]

Quilliou

[11] 4,393,759

[45] Jul. 19, 1983

[54] CHEESE MAKING APPARATUS

[75] Inventor: Guy Quilliou, Niort, France

[73] Assignee: Pierre Guerin S.A., Mauze-sur-le-Mignon, France

[21] Appl. No.: 335,763

[22] Filed: Dec. 30, 1981

[30] Foreign Application Priority Data

Jan. 15, 1981 [FR] France .................... 81 00611

[51] Int. Cl.³ .............. A01J 25/00; A23C 19/072
[52] U.S. Cl. .......................... 99/459; 53/438; 99/456; 99/460; 99/465; 100/110; 100/116; 100/182; 100/242; 425/84; 426/36; 426/491; 426/512; 426/582
[58] Field of Search ............ 99/452, 456–459, 99/460, 465, 349–351, 353, 355, 495, 496; 426/36, 478, 491, 414, 512, 582, 397; 100/116, 110, 113, 182, 184, 242; 425/84, 85, 80.1, 419; 210/513–515; 53/438, 122, 527, 436

[56] References Cited

U.S. PATENT DOCUMENTS

| | | | |
|---|---|---|---|
| 2,193,462 | 3/1940 | Miollis | 99/459 X |
| 2,214,860 | 9/1940 | Niethamer | 99/460 X |
| 2,324,636 | 7/1943 | Miollis | 426/512 X |
| 2,494,638 | 1/1950 | Stine | 99/460 X |
| 2,942,983 | 6/1960 | Sadler et al. | 99/460 X |
| 3,838,955 | 10/1974 | Dubbeld | 425/84 |
| 4,263,330 | 4/1981 | Streeter et al. | 99/456 X |
| 4,289,793 | 9/1981 | Gustafson et al. | 99/458 X |

Primary Examiner—Philip R. Coe
Assistant Examiner—Timothy F. Simone
Attorney, Agent, or Firm—Kurt Kelman

[57] ABSTRACT

A cheese making apparatus comprises a rectangular vat, a pressing plate, a filtering sheet supported on the bottom wall of the vat for displacement in a longitudinal direction, and a transverse partition affixed to an end of the filter sheet adjacent a fixed end wall of the vat for simultaneous displacement with the filtering sheet in this direction. The partition defines with the side walls, the bottom wall and a mobile end wall opposite the fixed end wall an operating volume of the vat determining the amount of curds to be held in the vat for producing cheese from a pressed mass of the curds wherefrom the whey has been drained. Displacement of the partition changes the operating volume and the transverse partition is elastically compressible in a vertical direction whereby lowering of the pressing plate into the vat compresses the partition and permits the plate to apply pressure to the curds held in the vat.

14 Claims, 11 Drawing Figures

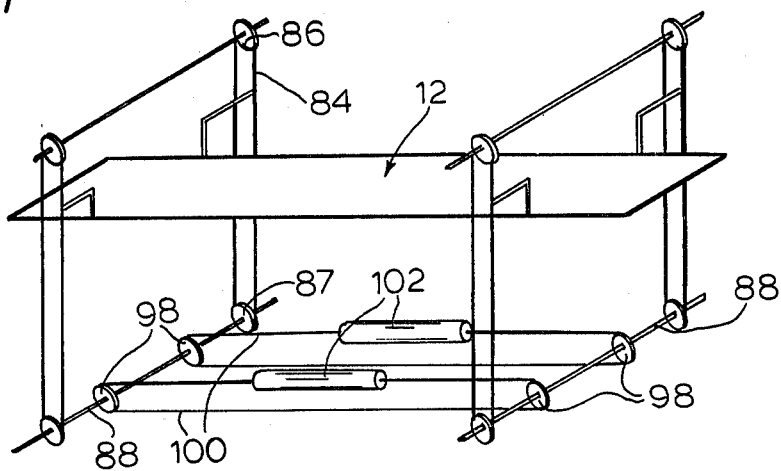
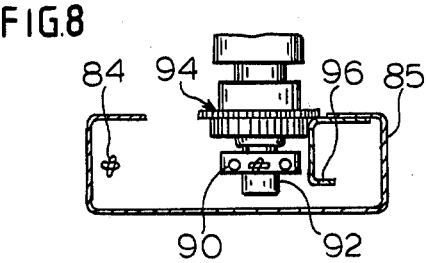
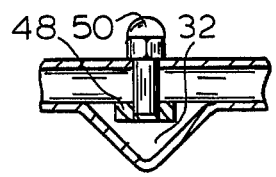
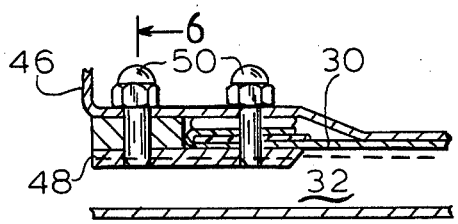
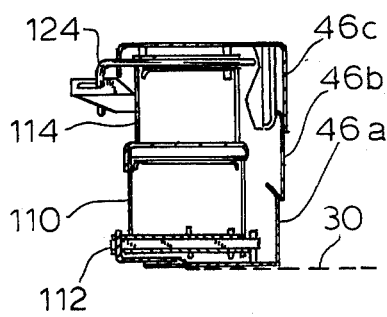
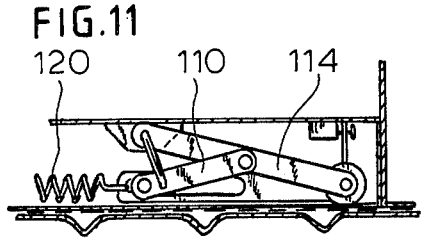

CHEESE MAKING APPARATUS

The present invention relates to improvements in cheese making apparatus for producing cheese from a pressed mass of curds wherefrom the whey has been drained, and more particularly to a vat wherein the curds are molded and whey is drained by pressing the curds, and the pressed curds are cut into pieces or blocks for making cheese.

Rectangular vats are used in cheese making apparatus and the bottom wall of such vats are covered by a metallic or plastic filtering sheet. A pressing plate of a slightly smaller cross sectional dimension than that of the vat is placed over the curds in the molding vat to press down upon the curds and thus to drain the curds of residual whey. The drained whey passes through the filtering sheet and is removed from the vat through grooves and collecting channels in the bottom wall of the vat. After the curds have been pressed and drained, a mobile end wall of the vat is raised and the filtering sheet supporting the pressed mass of curds is longitudinally displaced step-by-step to move this pressed mass of curds out of the vat and to cut it into pieces or blocks of predetermined dimensions by means of knives disposed at this output end of the vat.

In cheese making apparatus of this type, U.S. Pat. No. 2,193,462 proposes the use of a transversely extending and adjustable partition to modify the operating volume of the vat for holding batches of different size. Such modification requires not only the displacement of the transverse partition, which becomes difficult in a large vat and with a heavy partition, but also requires the length of the pressing plate to be adapted to the operating length of the vat obtained by a suitable adjustment of the partition, this adaptation of the pressing plate length involving the attachment or detachment of detachable elements of the plate.

It is the primary object of this invention to provide a vat in a cheese making apparatus whose operating volume may be rapidly and easily changed without changing the dimensions of the pressing plate and whose structure is quite simple.

It is another object of the invention to provide a hoisting device for the pressing plate which assures the uniform distribution of the pressure over the entire surface of the curds in the vat, whatever the dimensions of the mass of curds.

The above and other objects are accomplished according to the invention with a cheese making apparatus comprising a rectangular vat including a bottom wall, two longitudinally extending side walls, a fixed end wall and a mobile end wall opposite to the fixed end wall, the side and end walls defining interior dimensions of the vat. A pressing plate is arranged to be lowered into, and lifted out of, the vat, the pressing plate having outer dimensions slightly smaller than the interior dimensions of the vat. A filtering sheet is supported on the bottom wall of the vat for displacement in a direction parallel to the side walls, and a transversxe partition is affixed to an end of the filtering sheet adjacent the fixed end wall of the vat for displacement with the filtering sheet in this direction. The partition defines with the side walls, the bottom wall and the mobile end wall an operating volume of the vat determining the amount of curds to be held in the vat, and displacement of the partition changes the operating volume. The transverse partition is elastically compressible in a vertical direction whereby lowering of the pressing plate into the vat compresses the partition and permits the plate to apply pressure to the curds held in the vat. Means is provided for simultaneously displacing the filtering sheet and the transverse partition affixed thereto in this direction.

According to a preferred feature of the present invention, means for lowering and lifting the pressing plate includes four identical hoisting devices and means for synchronizing the vertical displacement of the hoisting devices, the hoisting devices being connected positively to the pressing plate at four points situated at the vertices of a rectangle and equidistantly spaced from the center of the pressing plate.

With this arrangement, all that is required for the adjustment of the operating volume of the vat is to operate the displacement control for the filtering sheet and the volume controlling position of the partition is obtained automatically. Fluid tightness between the mobile end wall and the filtering sheet is preferably obtained by an inflatable joint affixed to the mobile end wall.

The preferred hoisting system for the pressing plate will avoid, or at least limit, deformations of the pressing plate resulting, for example, from reaction forces applied to the plate by the elastically compressible transverse partition and assures the uniform distribution of pressure over the entire surface of the mass of curds. While these hoisting devices may be constituted by hydraulically synchronized jacks, the preferred hoisting devices are constituted by endless chains having vertically extending courses, one of the chain courses being connected to the pressing plate, and two pulleys over which each one of the endless chains is trained. At least one of the pulleys over which each chain is trained is a driven pulley and this is affixed to a drive shaft, the drive shafts being parallel to each other. A chain is coupled to the drive shaft for rotating the drive shafts, and a motor means is connected to the chain for driving the chain whereby the driven chain rotates the drive shafts.

The above and other objects, advantages and features of this invention will become more apparent from the following detailed description of certain now preferred embodiments thereof, taken in conjunction with the accompanying, generally schematic drawing wherein:

FIG. 5 is an enlarged sectional view showing the means for affixing the transverse partition to an end of the filtering sheet;

FIG. 6 is a section along lines 6—6 of FIG. 5;

FIG. 7 is a perspective view diagrammatically showing the preferred hoisting system for the pressing plate;

FIG. 8 is an enlarged view showing the connection of the pressing plate to the hoisting system of FIG. 7 in detail;

FIG. 10 is a section along lines 10—10 of FIG. 9; and

FIG. 11 is a partial view of the partition of FIG. 9 in compressed condition.

Figure 1:
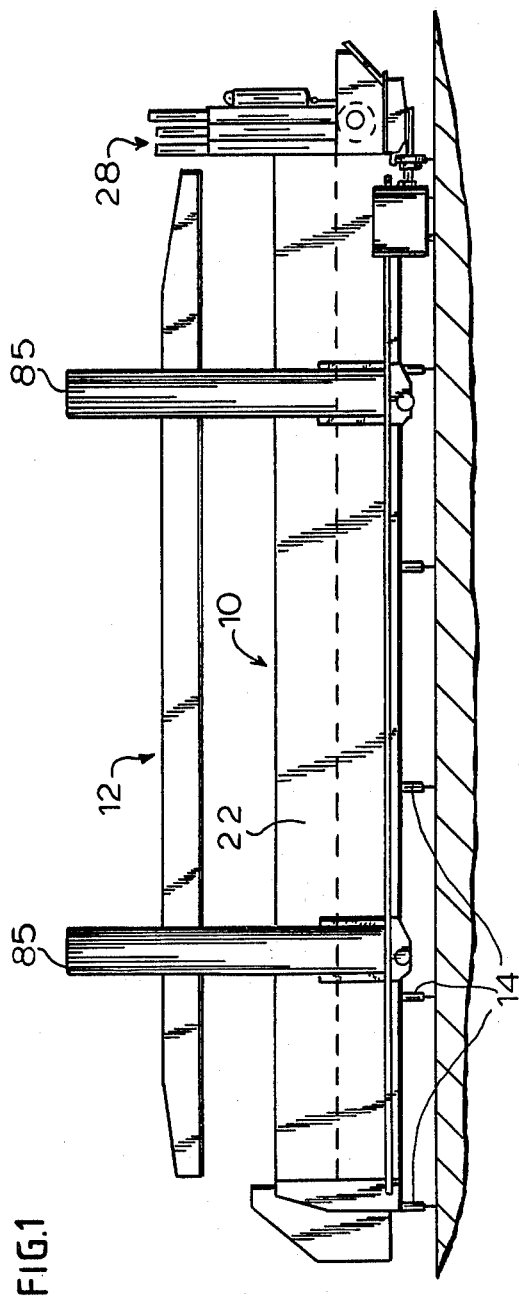
FIG. 1 is a side elevational view of a cheesemaking apparatus according to the invention.
Figure 2:
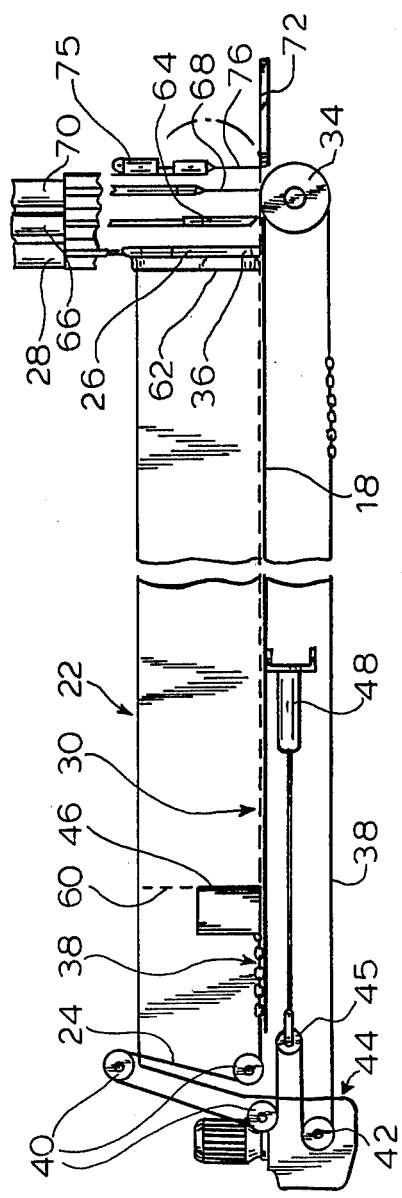
FIG. 2 is a diagrammatic longitudinal section showing the vat used in this apparatus and illustrating the mechanism for displacing the filtering sheet and the cutting knife arrangement for the pressed mass of curds at an output end of the vat.

Referring now to the drawing and first to FIGS. 1 and 2, there is shown rectangular vat 10 including bottom wall 18, two longitudinally extending side walls 22 interconnected by the bottom wall, fixed end wall 24 affixed to the bottom wall and the side walls, and mobile end wall 26 opposite the fixed end wall, the side and end walls defining interior dimensions of the vat. The mobile end wall constitutes a door at the output end of the vat and may be lifted by jack 28 to enable the pressed mass of curds to be removed from the vat.

Filtering sheet 30 is supported on bottom wall 18 of vat 10 for displacement in a direction parallel to the side walls in a manner to be described hereinafter. Usually, the filtering sheet is of synthetic resin material and defines longitudinally extending grooves or channels 32 (FIG. 3) leading to receptacles (not shown) for collecting whey passed through the filtering sheet when the curds are pressed. Filtering sheet 30 has a length exceeding the length of vat 10, and idling drum 34 is positioned outside the vat for reversing the sheet upon displacement thereof under mobile end wall 26, the filtering sheet being trained over the drum over an angle of 180° and thus reversed in its path. Inflatable joint 36 is positioned at the bottom of wall 26 so as to assure fluid-tightness between the wall and filtering sheet 30. The illustrated means for displacing the filtering sheet in a longitudinal direction comprises two chains 38 having ends affixed to the ends of the filtering sheet. Idling pulleys 40 over which the chains are trained pass the chains over fixed vat end wall 24, and these idling pulleys are mounted on vat 10. A power driven pulley 42 drives each chain 38 and pulleys 42 may be keyed to a common drive shaft rotated by electric motor 44. The rims of pulleys 42 are configurated to receive and entrain chains 38 without slippage. Two idling rollers 45 connected to jack 48 maintain chains 38 and filtering sheet 30 attached thereto under tension at all times, the chains being trained over these rollers between pulley means 40 and driven pulleys 42.

Pressing plate 12 is arranged to be lowered into, and lifted out of, vat 10 by hoisting devices 85 (described hereinafter in connection with FIG. 7). The pressing plate has outer dimensions only slightly smaller than the interior dimensions of the vat. The vat is supported on a horizontal frame equipped with cross beams and having feet 14 resting on the floor.

Transverse partition 46 is affixed to an end of filtering sheet 30 adjacent fixed end wall 24 of vat 10 for displacement with the filtering sheet in the longitudinal direction. The partition defines with side walls 22, bottom wall 18 and mobile end wall 26 an operating volume of the vat determining the amount of curds to be held in the vat, and displacement of the partition changes the operating volume. As will be explained more fully in connection with the preferred embodiment shown in FIGS. 9-11, transverse partition 46 is elastically compressible in a vertical direction whereby lowering of pressing plate 12 into vat 10 compresses the partition and permits plate 12 to apply pressure to the curds held in the vat. Means 34, 40, 42, 44, 45 and 48 simultaneously displaces filtering sheet 30 and transverse partition 46 affixed thereto in the longitudinal direction.

When pressing plate 12 is lowered into vat 10, it compresses partition 46 and thus reduces its height. For this purpose, the transverse partition may be comprised of a lower part affixed to the filter sheet end, an upper part, elastically compressible spring means biasing the upper part away from the lower part, and stop means limiting the spacing of the upper part from the lower part under the spring means bias whereby the transverse partition may be telescoped to change its height. Depending on the extent of the reduction of the thickness of the mass of curds during the pressing operation, the partition may comprise intermediate parts arranged between the lower and upper parts. The transverse partition is hollow and the spring means is mounted inside thereof. Unless the partition is subjected to a downward pressure above a predetermined limit the spring means will bias the partition parts apart so as to maintain the maximum height of the partition.

Figure 9:
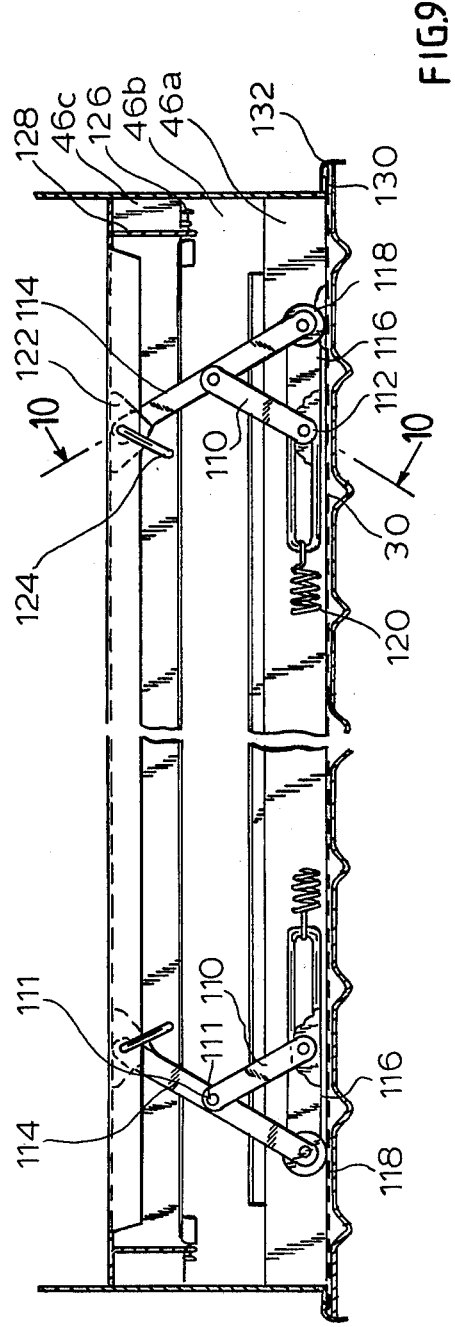
FIG. 9 is an enlarged side view of the transverse partition and preferred means for making the partition elastically compressible, certain parts being shown in section.

In the preferred embodiment of FIGS. 9 to 11, the partition comprises lower part 46a, intermediate part 46b and upper part 46c. Two systems of two levers 110 and 114 respectively linked together at fulcrums 111 and linked to respective ends of lower and upper transverse partition parts 46a and 46c interconnect the lower and upper partition parts. The spring means are coil springs 120 stretched between the levers of the system. Levers 110 are linked to the lower partition part at fulcrums 112 at one end of the levers and to other levers 114 substantially at the center of the other levers. One or more connecting rods 116 are linked to the lower end of other levers 114 and define elongated slots accommodating fulcrums 112. Coil springs 120 are stretched between the ends of the connecting rods at the two ends of the transverse partition. Upper partition part 46c comprises flanges 122 defining notches receiving tubular crossbars at the upper end of levers 114. It is held in position by pins 124 disposed in the tubular crossbars and engaging holes in the flanges welded to this partition part. In this manner, the upper transverse partition part is detachably mounted on the levers linked thereto.

Intermediate transverse partition part 46b is suspended on upper part 46c by two screws 126 which may slide in vertical slots cut into brackets 128 welded to the upper transverse partition part.

In the rest position, when no or no substantial vertical forces are applied to the transverse partition, coil springs 120 maintain rods 116 in abutment with axles 112, thus constituting stop means arranged to limit approachment of lower parts 46a to each other, the levers being in the position indicated in FIG. 9. When a vertical downward pressure exceeding the bias of springs 120 is applied to transverse partition 46, levers 110 and 114 are pivoted and permit intermediate and upper partition parts 46b and 46c to be downwardly displaced until they assume the position shown in FIG. 11. The horizontal displacement of rods 116 and the lower end of levers 114 is facilitated by rollers 118 idling on the fulcrum axle of these levers. As soon as the downward pressure is relieved, the bias of springs 120 will pivot the levers back again to raise partition parts 46b, 46c, and the transverse partition will assume its original height.

Flanges 130 affixed to the two ends of transverse partition 46 at the bottom thereof are engaged in longitudinally extending guide rails 132 mounted at the bottom of vat 10 to prevent the partition from tipping over.

As shown in FIGS. 5 and 6, transverse partition 46 is affixed to filtering sheet 30 by means of longitudinally disposed iron plates 48 defining tapped holes threadedly receiving screws 50. The iron connecting plates and the ends of the screws are arranged in grooves 32 in the bottom of the vat. This disposition avoids any metal-to-metal friction.

As shown in FIG. 2, auxiliary wall 60 constituted by a perforated metal sheet is affixed to transverse partition 46 during filling of the vat and draining of the curds, and this auxiliary wall is removed before the pressing operation.

The interior surface of mobile end wall 26 of vat 10 is covered by filter panel 62 constituted by a perforated metal sheet spaced from the wall to permit a portion of the whey to be removed during draining and pressing of the curds.

As shown in FIG. 2, the preferred embodiment of the cheese making apparatus of the present invention further comprises two vertically extending knives 64 and 68 for cutting the pressed curds into rectangular blocks or pieces at the outlet end of the vat in front of end wall 26. Knife 68 is disposed transversely in front of knives 64. Knives 64 are arrayed regularly over the width of filtering sheet 30 and serve to divide the pressed mass of curds into several bars of identical cross section when this mass is discharged from vat 10 upon longitudinal displacement of the filtering sheet which carries the mass and opening of mobile end wall 26. These knives remain in place during the entire operation of removing and cutting the pressed mass of curds but they may be lifted by operation of jack 66 for adjustment or maintenance. The spacing of knives 64 on their support may be adjustable for the production of different types of cheese. Alternatively, several sets of interchangeably knives may be provided.

Jack 70 is connected to transversely disposed knife 68 for vertically reciprocating the knife to cut the bars of the pressed mass of curds into rectangular pieces or blocks. For this purpose, filtering sheet 30 carrying the bars of pressed curds is advanced step-by-step and, each time the advance of the filtering sheet is halted, knife 68 is moved downwardly and, after the rectangular pieces of pressed curds are removed, it is moved upwardly again to permit the next step of advancement of the filtering sheet carrying the pressed mass of curds.

Safety shutter or gate 76 is mounted in front of knives 64 and 68 for pivotal movement about a horizontal axis and another jack 75 is connected to the safety shutter for pivoting the shutter about this axis. A system is provided for controlling the displacement of filtering sheet 30 step-by-step, the downward movement of transversely disposed knife 68 between each step of the displacement, and the subsequent upward movement of knife 68, the controlling system also controlling other jack 75 for upwardly pivoting safety shutter 76 after the downward movement of knife 68 to permit the pieces of the pressed curds to be removed, and for subsequently pivoting the shutter donwardly.

The controlling system includes an automatic control of drive motor 44 for chain 38 attached to the respective ends of filtering sheet 30 and of knife lifting jacks 70 and safety shutter lifting jack 75. The displacing means comprises an impulse generator mounted on drum 34 to measure the stepwise displacement of the filtering sheet trained over this drum, and which controls the displacement in a step-by-step movement. A counter is associated with the impulse generator and a comparator device compares the measured values with a norm set by an operator before the beginning of the operation, the comparator generating a control signal stopping operation of motor 44 when the measured value reaches the set norm. At this point, the control system operates jack 75 to reciprocate knife 68 and, after the knife has been raised, to start the motor again for the next step of advancement. A proximity detector interrupts this cycle of operations when the filtering sheet has advanced so far that transverse partition 46 is close to knives 64. Instead of an automatic control, the advancement of the filtering sheet after each step may also be controlled by an operator.

Table 72 is arranged in front of drum 34 at the same level as filtering sheet 30. This table receives the cut rectangular pieces of pressed curds which are pushed onto the table by each succeeding advancement of the filtering sheet carrying the pressed curds.

The safety gate or shutter prevents accidental access to the area of the knives during cutting. The upper edge of the safety shutter is fixed to a horizontal axle journaled in bearings, the axle and bearings being arranged for rapid detachment of the safety shutter. The axle carries a crank equipped with a crankpin gliding in the slot of a strap fixed to the piston rod of jack 75 pivotally mounted on a horizontal axle parallel to the axle supporting the safety shutter. This construction enables the safety shutter to oscillate freely while it is in the lowered position and permits its raising by jack 75 only after it has first been moved from its vertical position by the pieces of pressed curds being removed. When there is no piece of pressed curds on table 72, safety shutter 76 is in the vertical position. When filtering sheet 30 advances, the pressed mass of curds pushes the safety shutter and lifts it. When the filtering sheet is stopped, knife 68 descends and safety shutter 76 is raised by jack 75. In this manner, the cut pieces may be reached for removal. At the start of the next cycle of operations, jack 75 lowers safety shutter 76 again and the shutter assumes its vertical position. A proximity detector prevents upward movement of knife 68 and the displacement of the filtering sheet as long as the shutter has not resumed its vertical position because of some obstacle in its way.

If desired, freely movable safety shutters may also be mounted on the support axle of shutter 76 at both sides of the pressed mass of curds to prevent lateral access to knife 68.

Figure 3:
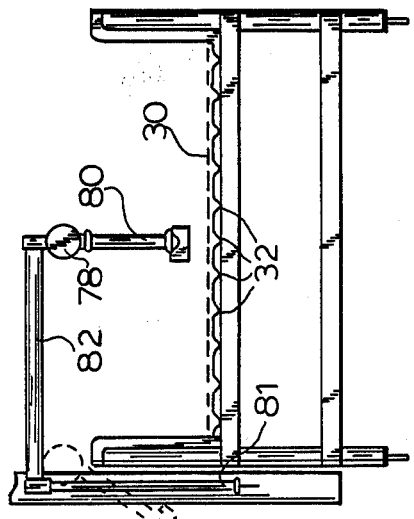
FIG. 3 is a simplified view, in transverse section, of the vat.
Figure 4:
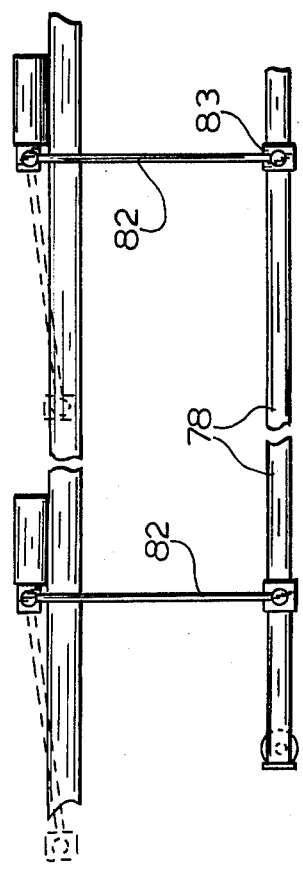
FIG. 4 is a partial top view showing the filling means for the vat.

As shown in FIGS. 3 and 4, the preferred embodiment of the cheese making apparatus of this invention also comprises means for filling vat 10. The illustrated filling means is disposed horizontally and extends in a longitudinal direction above the vat. It is constituted by horizontally extending tubular main 78 mounted above the upper edge of the vat and equipped with a plurality of branch pipes 80 extending into the vat. Pivotal support means constituted by two arms 82 supports the tubular main and vertical axles 81 mounted along a side wall 22 of vat 10 pivotally support arms 82. Collars 83 support the filling means main on support arms 82 and permit rotation of tubular main 78 about its axis. When the filling means is in operation, main 78 and its branch pipes 80 are placed in the longitudinal center plane of the vat and the branch pipes extend vertically to point into the vat, as shown in full lines in FIGS. 3 and 4. After the vat has been filled, the main is turned so that the branch pipes extend more or less horizontally and the support arms are pivoted to bring the main above the side wall of the vat so that the branch pipes are located outside the vat (chain-dotted lines in FIGS. 3 and 4). This operation may be effectuated manually but, if desired, the rotation of main 78 and the pivoting of support arms 82 may be effectuated mechanically by jacks or other suitable moving means controlled either manually or automatically.

The preferred lowering and lifting means for pressing plate 12 is illustrated in FIG. 7. This lowering and lifting means includes four identical hoisting devices 84 and means 87, 88, 98, 100 and 102 for synchronizing the vertical displacement of the hoisting devices. The hoisting devices are connected positively to pressing plate 12 at four points situated at the vertices of a rectangle and spaced equidistantly from the center of the pressing plate. In the illustrated embodiment, each hoisting device 84 is constituted by an endless chain having vertically extending courses and placed in hollow post 85 affixed to vat 10 (see FIGS. 1 and 8). One of the chain courses is affixed to pressing plate 12 and each endless chain is trained over two pulleys 86 and 87, idling upper pulley 86 being mounted on post 85 while lower pulley 87 is a driven pulley. The driven pulley is keyed to horizontal drive shaft 88 mounted under vat 10. The drive shafts to which driven pulleys 87 of the four hoisting chains 84 are affixed are parallel to each other and chains 100 are coupled to driven shafts 88 for rotating the driven shafts in synchronization. Motor means 102 is connected to each chain 100 for driving the chain whereby the driven chain rotates the driven shafts.

As shown in FIG. 8, pressing plate 12 is positively connected to one of the courses of each hoisting chain 84 by means of clamping element 90 fixed to the chain and mounted without play on horizontal stub axle 92 which is affixed to the pressing plate. Hollow posts 85 are open at their interior face to permit passage of stub axle 92 during the vertical displacement of the pressing plate. Idling rollers 94 on stub axle 92 engage vertical guide rails 96 affixed to posts 85 to prevent movement of pressing plate 92 in its plane. Means is provided for adjusting the position of clamping elements 90 along the length of the respective hoisting chains and for tensioning the chains.

As illustrated in FIG. 7, the two driven pulleys 87 of each pair of hoisting chains 84 are arranged face-to-face at opposite sides of vat 10 and are keyed to the same driven shaft 88 carrying transmission wheels 98 over which driving chains 102 are trained. Two chains 102 are stretched between the two parallel driven shafts 88, the two ends of each chain being attached to the piston of jack 102 mounted below the vat. The rims of pulleys 87 and 98 receive and entrain chains without slippage so that the reciprocating displacement of the pistons of motor jacks 102 causes vertically reciprocating displacement of pressing plate 12. Suitable means guide and tension chains 102.

A locking system maintains pressing plate 12 in a lifted position and this may comprise bolts mounted on each post 85 or on some of the posts to be positioned automatically under respective stub shafts 92 when the pressing plate has reached its upper position so that the plate is locked in this position. A safety system prevents the locking bolts from being retracted as long as motor jacks 102 are not operated to cause the pressing plate to descend.

Pressing plate 12 carries nozzles on its inner surface for projecting a washing liquid on the walls of the vat when it is empty. These washing nozzles are protected by suitable means during the pressing operation. Washing means is also provided for cleaning portions of filtering sheet 30 outside the vat.

While the present invention has been described herein in connection with certain now preferred embodiments, it will be understood by those skilled in the art that equivalent structural means may be used without departing from the spirit and scope of this invention as defined in the appended claims.

What is claimed is:
1. A cheese making apparatus for producing cheese from a pressed mass of curds wherefrom the whey has been drained, which comprises
   (a) a rectangular vat including
      (1) a bottom wall,
      (2) two longitudinally extending side walls,
      (3) a fixed end wall and
      (4) a mobile end wall opposite the fixed end wall, the side and end walls defining interior dimensions of the vat,
   (b) a pressing plate arranged to be lowered into, and lifted out of, the vat, the pressing plate having outer dimensions slightly smaller than the interior dimensions of the vat,
   (c) a filtering sheet supported on the bottom wall of the vat for displacement in a direction parallel to the side walls,
   (d) a transverse partition affixed to an end of the filtering sheet adjacent the fixed end wall of the vat for displacement with the filtering sheet in said direction, the partition defining with the side walls, the bottom wall and the mobile end wall an operating volume of the vat determining the amount of curds to be held in the vat, and displacement of the partition changing the operating volume, and the transverse partition being elastically compressible in a vertical direction whereby lowering of the pressing plate into the vat compresses the partition and permits the plate to apply pressure to the curds held in the vat, and
   (e) means for simultaneously displacing the filtering sheet and the transverse partition affixed thereto in said direction.

2. The cheese making apparatus of claim 1, wherein the transverse partition comprises a lower part affixed to the filter sheet end, an upper part, elastically compressible spring means biasing the upper part away from the lower part, and stop means limiting the spacing of the upper part from the lower part under the spring means bias.

3. The cheese making apparatus of claim 2, wherein the transverse partition further comprises at least one intermediate part arranged between the lower and upper parts.

4. The cheese making apparatus of claim 2 or 3, further comprising two systems of two levers respectively linked together and linked to respective ends of the lower and upper transverse partition parts, and the spring means are stretched between the levers of the systems.

5. The cheese making apparatus of claim 4, wherein one of the levers of each of said systems is linked to the other lever thereof substantially at the center of the other lever, an upper end of the other lever is linked to the upper transverse partition part and a roller supports the lower end of the other lever on the lower transverse partition part, the spring means being stretched between the lower ends of the said other levers and said stop means being arranged to limit approachment of the lower parts to each other.

6. The cheese making apparatus of claim 5, wherein the upper transverse partition part is detachably mounted on the levers linked thereto.

7. The cheese making apparatus of claim 1, wherein the filtering sheet has a length exceeding the length of the vat, further comprising a drum positioned outside the vat for reversing the sheet upon displacement thereof, and the displacing means comprising a chain having ends affixed to the ends of the filtering sheet, pulley means over which the chain is trained for passing the chain over the fixed vat end wall, the pulley means being mounted on the vat, and a power-driven pulley driving the chain.

8. The cheese making apparatus of claim 7, wherein the displacing means comprises an impulse generator associated with the drum and controlling the displacement in a step-by-step movement.

9. The cheese making apparatus of claim 1, further comprising means for lowering and lifting the pressing plate, the lowering and lifting means including four identical hoisting devices and means for synchronizing the vertical displacement of the hoisting devices, the hoisting devies being connected positively to the pressing plate at four points situated at the vertices of a rectangle and equidistantly spaced from the center of the pressing plate.

10. The cheese making apparatus of claim 9, wherein the hoisting devices are constituted by endless chains having vertically extending courses, one of the chain courses being connected to the pressing plate, and two pulleys over which each one of the endless chains is trained, at least one of the pulleys over which each chain is trained being a driven pulley, and further including a drive shaft to which each driven pulley is affixed, the drive shafts being parallel to each other, a chain coupled to the drive shafts for rotating the drive shafts, and a motor means connected to the chain for driving the chain whereby the driven chain rotates the drive shafts.

11. The cheese making apparatus of claim 9 or 10, further comprising a locking system for maintaining the pressing plate in a lifted position.

12. The cheese making apparatus of claim 1, further comprising horizontally disposed filling means extending in the longitudinal direction above the vat, pivotal support means for the filling means, and vertical axles mounted along a respective one of the side walls of the vat for pivotally supporting the support means.

13. The cheese making apparatus of claim 1, further comprising an inflatable joint affixed to the mobile end wall of the vat for assuring fluid-tightness between the filtering sheet and the mobile end wall.

14. The cheese making apparatus of claim 1, further comprising two vertically extending knives for cutting the pressed curds into rectangular pieces, one of the knives being disposed transversely, a jack connected to the transversely disposed knife for vertically reciprocating the knife, a safety shutter mounted in front of the knives for pivotal movement about a horizontal axis, another jack connected to the safety shutter for pivoting the shutter about the axis, a system for controlling the displacement of the filtering sheet step-by-step, the downward movement of the transversely disposed knife between each step of the displacement, and the subsequent upward movement of the knife, the controlling system also controlling the other jack for upwardly pivoting the shutter after the downward movement of the knife to permit the pieces of the pressed curds to be removed, and for subsequently pivoting the shutter downwardly, and a proximity detector preventing the upward movement of the knife and the displacement of the filtering sheet as long as the shutter has not resumed its vertical position.

* * * * *